(12) United States Patent
Boncz et al.

(10) Patent No.: US 8,908,635 B2
(45) Date of Patent: Dec. 9, 2014

(54) METHOD AND A NETWORK NODE FOR CONTROLLING OUTPUT UPLINK AND DOWNLINK POWER LEVELS IN A MOBILE COMMUNICATIONS SYSTEM

(75) Inventors: Lars Boncz, Stockholm (SE); Andreas Olsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 478 days.

(21) Appl. No.: 12/593,931

(22) PCT Filed: May 23, 2007

(86) PCT No.: PCT/SE2007/050349
§ 371 (c)(1),
(2), (4) Date: Sep. 30, 2009

(87) PCT Pub. No.: WO2008/143564
PCT Pub. Date: Nov. 27, 2008

(65) Prior Publication Data
US 2010/0074227 A1   Mar. 25, 2010

(51) Int. Cl.
*H04W 4/00* (2009.01)
*H04B 7/00* (2006.01)
*H04W 52/40* (2009.01)
*H04W 52/22* (2009.01)
*H04W 52/50* (2009.01)

(52) U.S. Cl.
CPC ............ *H04W 52/40* (2013.01); *H04W 52/228* (2013.01); *H04W 52/50* (2013.01)
USPC .......................................... 370/331; 455/522

(58) Field of Classification Search
USPC ........................................................ 370/331
See application file for complete search history.

(56) References Cited

U.S. PATENT DOCUMENTS 5,982,760 A * 11/1999 Chen ............................ 370/335
6,141,553 A * 10/2000 Fernandez et al. ............ 455/436
(Continued)

FOREIGN PATENT DOCUMENTS

EP    0 515 335 A2    5/1991
EP    1 220 471 A1    7/2002
(Continued)

OTHER PUBLICATIONS

International Search Report dated Mar. 6, 2008 (5 pages).
(Continued)

*Primary Examiner* — Gerald Smarth
(74) *Attorney, Agent, or Firm* — Myers Bigel Sibley & Sajovec, P.A.

(57) ABSTRACT

The present inventions relates to a method and a network node for controlling an output uplink power level of a mobile station and for controlling an output downlink power level of a target base station in a target cell of a mobile communications system. The method comprises receiving at the network node a message indicating that a handover of the mobile station from an originating cell to the target cell is completed; and commanding the target base station to use an initial output downlink power level and the mobile station to use an initial output uplink power level, wherein the initial output downlink power level and the initial output uplink power level are based on at least previous power control levels used a time after previous handovers were completed between the originating cell and the target cell.

16 Claims, 9 Drawing Sheets

(56) References Cited

U.S. PATENT DOCUMENTS

| | | | |
|---|---|---|---|
| 6,212,405 B1* | 4/2001 | Jiang et al. | 455/561 |
| 6,438,116 B1* | 8/2002 | Corbett | 370/331 |
| 6,473,614 B1* | 10/2002 | Quensel et al. | 455/436 |
| 6,515,975 B1* | 2/2003 | Chheda et al. | 370/332 |
| 6,711,408 B1* | 3/2004 | Raith | 455/440 |
| 6,804,212 B1* | 10/2004 | Vallstrom et al. | 370/331 |
| 6,993,359 B1* | 1/2006 | Nelakanti et al. | 455/554.1 |
| 7,251,226 B2* | 7/2007 | Lindsay et al. | 370/331 |
| 7,376,425 B2* | 5/2008 | Laroia et al. | 455/437 |
| 2002/0090965 A1* | 7/2002 | Chen et al. | 455/522 |
| 2002/0122406 A1* | 9/2002 | Chillariga et al. | 370/347 |
| 2005/0261017 A1* | 11/2005 | Vaittinen et al. | 455/522 |
| 2006/0251038 A1* | 11/2006 | Tamura et al. | 370/342 |
| 2008/0049674 A1* | 2/2008 | Cha et al. | 370/331 |

FOREIGN PATENT DOCUMENTS

| | | |
|---|---|---|
| EP | 0 806 120 B1 | 5/2005 |
| JP | 6-164470 A | 6/1994 |
| JP | H10-501391 A | 2/1998 |
| JP | 2002-520984 | 7/2002 |
| JP | 2006-270489 A | 10/2006 |
| WO | WO 95/35003 A1 | 12/1995 |
| WO | WO 98/11677 A2 | 3/1998 |
| WO | WO 00/04650 | 1/2000 |
| WO | WO 02/47361 A2 | 6/2002 |

OTHER PUBLICATIONS

Written Opinion dated Mar. 6, 2008 (5 pages).

Office Action for corresponding Japanese Application No. 2010-509298 mailed Apr. 24, 2012 with English Summary of Ground for Rejection.

ETRI:"Seamless Interfrequency Hard Handover," 3GPP Draft; R1-01-0190, $3^{rd}$ Generation Partnership Project (3GPP), Mobile Competence Centre; 650, Route De Lucioles; F-06921 Sophia-Antipolis Cedex; France, vol. RAN WG1, No. Las Vegas, 20010219, Feb. 19, 2001, XP050094212.

Office Action for corresponding European Application No. 07 748 510.0 mailed Jul. 10, 2013.

Office Action for corresponding European Application No. 07 748 510.0-1855, mailed Jan. 22, 2014.

* cited by examiner

| NEIGHBOUR RELATION | MS_TXPWR_appr LEVEL (dBm) | BS_TXPWR_appr LEVEL (dBm) |
|---|---|---|
| BTS1 - BTS2 | 15 | 12 |
| BTS2 - BTS3 | 17 | 13 |
| BTS1 - BTS3 | 11 | 10 |

METHOD AND A NETWORK NODE FOR CONTROLLING OUTPUT UPLINK AND DOWNLINK POWER LEVELS IN A MOBILE COMMUNICATIONS SYSTEM

TECHNICAL FIELD

The present invention relates generally to the mobile communications field and, in particular, to a method and a network node for controlling an output uplink power level of a mobile station and an output downlink power level of a base station in a mobile communications system.

BACKGROUND

In mobile communications systems such as GSM (Global System for Mobile communications) and GPRS (General Packet Radio Service), the transmit power level of mobile stations and the transmit power level of base stations are usually controlled by power control algorithm (s) that is/are implemented either in base stations or in base station controllers of the mobile communications system. One purpose of power control is to decrease the interference in the network without jeopardizing the quality of a connection between a mobile station and a serving base station. Power control is especially important in mobile communications systems since, in these systems, mobile stations are free to move or roam from one cell to another cell within the network and/or between cells belonging to different networks. For example, a mobile station can be handed over from one cell to another neighbouring cell if the neighbouring cell enables communications at lower transmit power levels than the original cell. In such a scenario, the power control algorithm determines an appropriate transmit power level and informs the mobile station of the appropriate transmit power level to use in a power control command. Handovers can also be used for load balancing between cells (e.g. a mobile station can be moved from a congested cell to a cell with less traffic).

As a preparation for handover, various kinds of radio link measurements are required to decide if a mobile station needs to be handed over from a serving cell to a target cell. As an example, a mobile station can perform radio link measurements of the target cell's downlink signal strength and of the serving cell's downlink signal strength and quality and inform a base station controller, BSC, of these measurements in measurement reports. The BSC may thereafter decide if a handover shall be carried out. The BSC will receive measurement reports from a base station or a base transceiver station. BTS, of the serving cell and from the BTSs of neighbouring cells and use these together with the reports from the mobile station, to decide if a handover should be performed. If a handover decision is taken, the BSC sets up resources in the selected target cell and orders the mobile station to switch to the selected target cell. After that the handover is completed, the mobile station and the BTS start to send measurements reports to the BSC in order to regulate the output power of the mobile station and the BTS.

However, power control algorithm(s) in the BSC needs several measurements reports before ordering the mobile station and/or the BTS to regulate its/their power(s). For this reason. the mobile station and/or the BTS, following a handover, preferably use high power (e.g. maximum power) level(s) in the cell. This is because, high transmit power levels ensure an adequate link quality regardless of the location of the mobile station relative the serving BTS. Thus before the power control algorithm(s) is able to order the mobile station and/or the BTS to use a stable (appropriate) output transmit level(s), following the handover, unnecessary interference is created in the network.

In addition, since measurement reports, which are used as inputs to the power control algorithm(s), usually arrive periodically (e.g. in intervals of 0.48 seconds in GSM), the power control algorithm(s) require, for stability reasons. several measurements reports to find suitable power level(s) and thus it will take some seconds before suitable power level(s) is/are reached. This will therefore shorten the battery life in the battery-powered mobile station.

In the international patent application WO 95/35003 it is described a power control method for a handover in a mobile communication system in which each cell is assigned a maximum transmitting power level at which mobile stations are allowed to use in the cell, and an optimum power level for the uplink signal which the mobile station is to achieve following the handover. According to the method in this prior art, the initial transmitting power the mobile station is to use in the target cell, following the handover, is lower than the maximum transmitting power of the target cell by an amount equal to the difference between the optimum level for the uplink signal and the receive level of the downlink signal of the target cell as measured prior to the handover, if the measured receive level of the target cell is higher that the optimum level for the uplink signal. Thus, the method described in this prior art reduces the above mentioned unnecessary interference created in the network, following the handover.

However, a drawback with the method described above is that it jeopardizes the robustness of the handover signalling between the BTS of the target cell and the mobile station. In addition, the power control method does not adapt to variations in the radio network conditions since it is based on the statically assigned optimum level value for the uplink signal and on the receive level of the downlink measured prior to the handover. Furthermore, the method described in this prior art only deals with power control of the uplink transmit power.

SUMMARY

It is an object of the present invention to address the needs above as well as other needs by providing a method and a network node for controlling an output uplink power level of a mobile station and controlling an output downlink power level of a target base station in a mobile communication system such that unnecessary interference in the network is reduced without jeopardizing the robustness of handover signalling in the system thus achieving higher spectrum utilization in the mobile communication system. Furthermore, the method and the network node of the present invention can dynamically adapt to variations in the radio network conditions.

According to a first aspect of the present invention, the above stated problems are solved by means of a method for controlling an output uplink power level of a mobile station and controlling an output downlink power level of a target base station in a mobile communication system. The method comprises: receiving at a network node of the mobile system a message indicating that a handover of the mobile station from an originating cell to a target cell is completed; and commanding, by the network node, the target base station to use an initial output downlink power and the mobile station to use an initial output uplink power that are both based on at least previous power control levels used a time after previous handovers were completed. The previous handovers refer to previously completed handovers performed between the originating cell and the target cell.

According to a further aspect of the present invention, the above stated problems are solved by means of a network node of a mobile communication system that is configured to control an output uplink power level of a mobile station and control an output downlink power level of a target base station in a target cell of the mobile system. The network node comprises a receiver that is configured to receive a message indicating that a handover of the mobile station from an originating cell to the target cell is completed. The network node further comprises commanding means that is operable to command, after reception of the above message, the target base station to use an initial downlink power level and operable to command the mobile station to use an initial uplink power level that are both based on at least previous power control levels used a time after previous handovers were completed between the originating cell and the target cell.

According to the present invention, the previous power control levels used a time after previous handovers were completed, are stored in a database in the network node and are further updated after completion of new handovers in the mobile communications system. Furthermore, the time after previous handovers. may refer to the time it takes to adjust, following a previous handover (or handovers), the output uplink power level of a mobile station to an appropriate power level and to adjust the output downlink power level of a target base station to an appropriate power level.

The present invention will now be described in more details by means of exemplary embodiments and with reference to the accompanying drawings, attention to be called to the fact, however, that the following drawings are illustrative only, and that changes may be made in the specific embodiments illustrated and described within the scope of the appended claims.

DETAILED DESCRIPTION

The invention is described in a general context in relation to the GSM system. However, the present invention and its embodiments can be applied to GPRS and EDGE (Enhanced GPRS) or any cellular or mobile communications system, such as, UMTS (Universal Mobile Telecommunications System), LTE (Long Term Evolution) etc., and the present invention is therefore not intended to be limited to any particular mobile communications system.

Figure 1A:
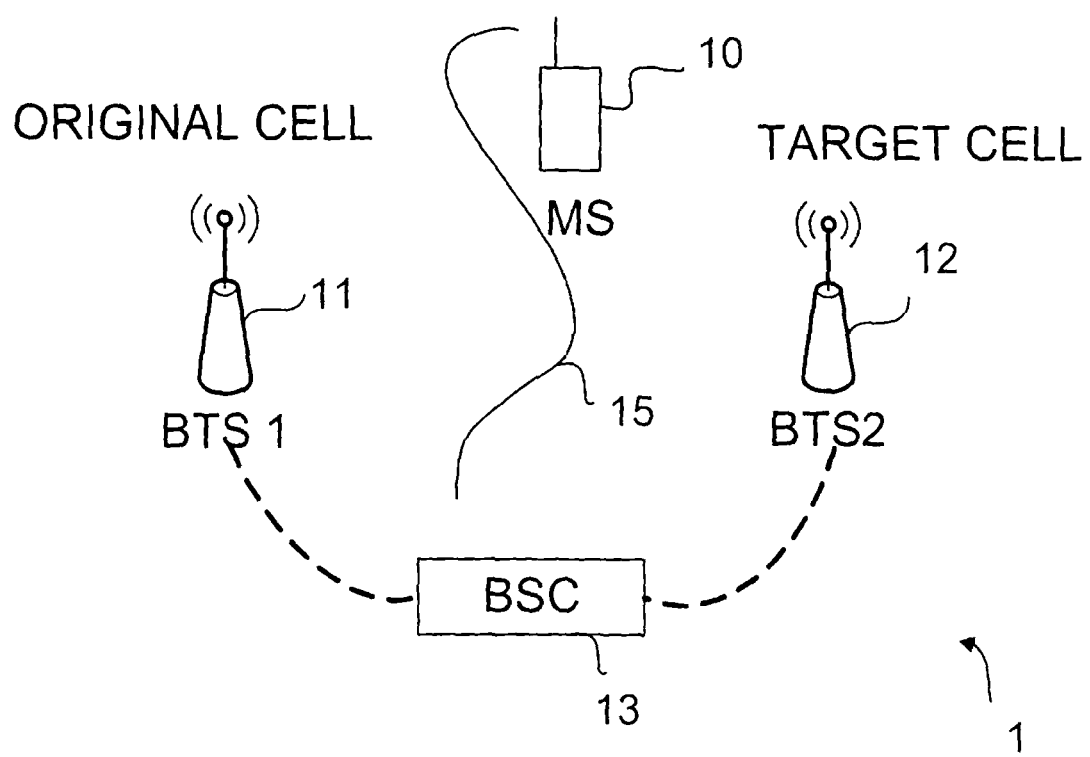
FIG. 1A is a block diagram illustrating an example of a mobile communication system to which to present invention can be applied.
Figure 1B:
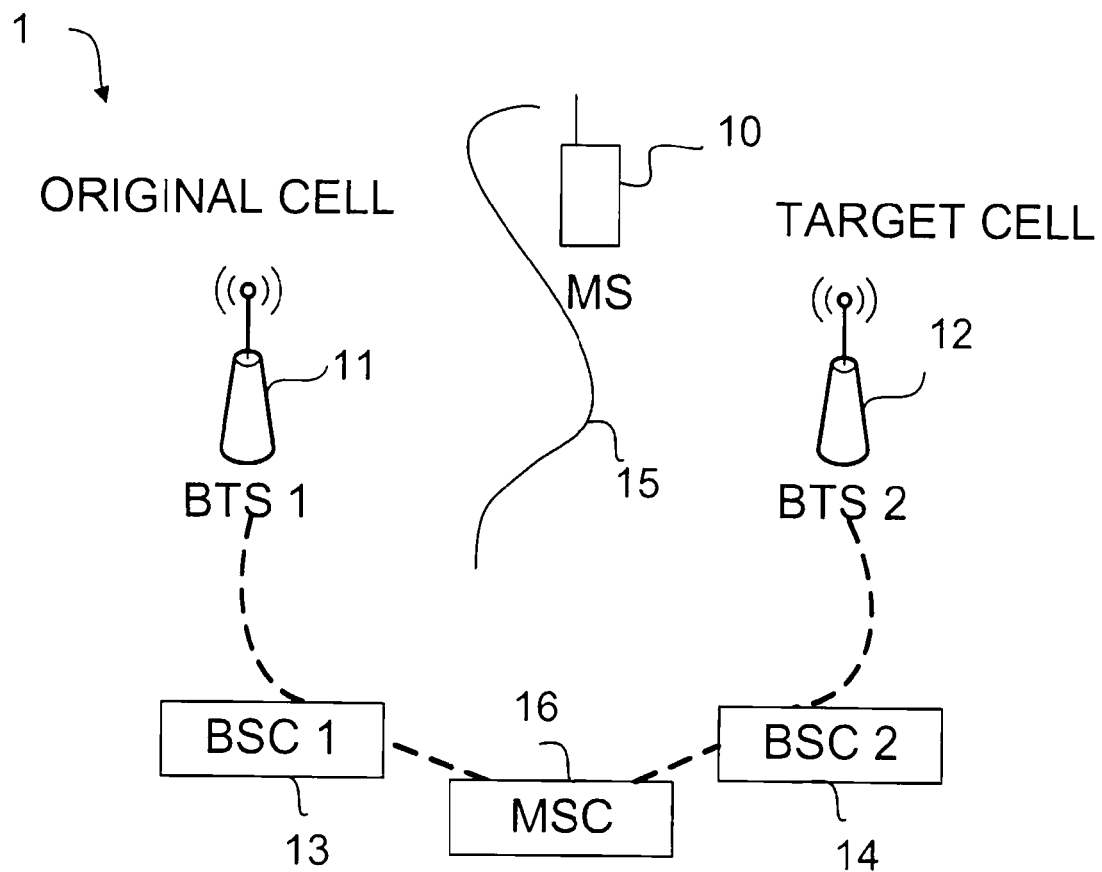
FIG. 1B is a block diagram illustrating another example of a mobile communication system to which to present invention can be applied.

Referring to FIG. 1A and FIG. 1B there are illustrated very briefly some network elements of two examples of a mobile communication system 1 of the GSM type to which the present invention can be applied. As illustrated in FIGS. 1A and 1B, a GSM system 1 includes a plurality of cells which are characterized by base transceiver systems (stations) (BTS1) 11 and (BTS2) 12 that define individual cells. A cell boundary 15 is also depicted. Note that in other mobile or cellular systems, cells can be defined by radio base stations (RBS), but the term BTS is used for the GSM system. A BTS is also known in GSM as a base station (BS). In FIG. 1A the GSM system 1 also includes a base station controller (BSC) 13 that is used to control BTSs (BTS1, BTS2, . . . ). One typical task of a BSC is, among other functions, to handle handovers of mobile stations (e.g. mobile station 10) from an original (or originating) cell to a target cell in a network. In FIG. 1B, two base station controllers (BSC1) 13 and (BSC2) 14 are shown wherein on one hand BSC1 13 controls BTS1 11 and on the other hand BSC2 14 controls BTS2 12. As shown in FIG. 1B, BSC1 13 and BSC2 14 are further connected to each other, via an MSC 16 (mobile services switching centre). Other relevant elements of a GSM system that, for reasons of clarity, are neither illustrated in FIG. 1A nor in FIG. 1B are e.g. a home location register (HLR) and a visitor location register that handle subscriber information such as locations, subscriptions and other subscriber information.

As mentioned above, a base station controller usually handles handovers of mobile station from an original or originating cell to a target cell. Decisions on handovers are also made by base station controllers on the basis of various handover parameters and on the basis of measurements results reported by a mobile station and base transceiver stations. As an example and referring to FIG. 1A and FIG. 1B, MS 10 has, prior to switching to the target cell served by BTS2, monitored and measured the radio link quality and level of the downlink signal of BTS1 11 and also monitored and measured level of the downlink signal of each of the neighbouring cells, among which BTS2 12 belongs. BTS1 11 has measured the radio link quality and level of the uplink signal of MS 10. All measurements were thereafter transmitted to BSC1 11 that decided that MS 10 be handed over from the original cell to the target cell.

Following the handover, MS 10 and BTS2 12 starts to send measurements reports to the base station controller that is controlling BTS2 12, which in FIG. 1A is BSC 13 and in FIG. 1B is BSC2 14. The measurement report sent by MS 10 includes the receive level of the downlink signal and the quality of the downlink signal received from BTS2. The measurement report sent by BTS2 includes the receive level of the uplink signal and the quality of the uplink signal received from MS 10. On the basis of several of these measurement reports and other power control parameters, a power control algorithm (or algorithms) in the base station controller determines an appropriate output uplink power level which MS 10 is to use and send it in an uplink power control command to MS 10. The base station controller also determines an appropriate output downlink power level which BTS2 12 is to use and send it in a downlink power control command to BTS2 12. These procedures are repeated several times until stable output levels (downlink and uplink) are reached.

Figure 2A:
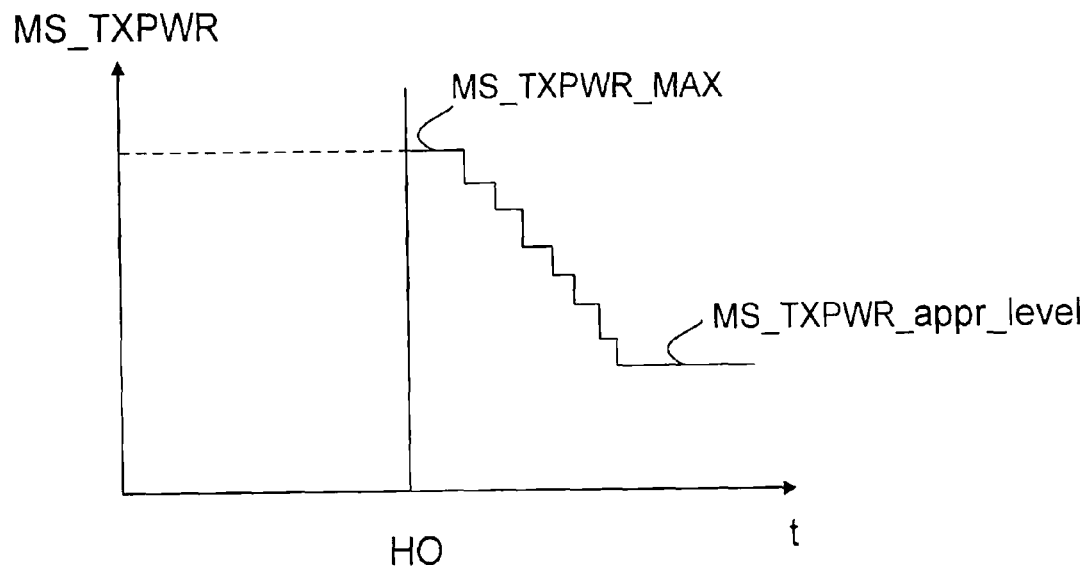
FIGS. 2A-2B are block diagrams illustrating transmitting power control, after the completion of the handover HO, for the uplink (FIG. 2A) and transmitting power control, after the completion of the handover HO, for the downlink (FIG. 2B)
Figure 2B:
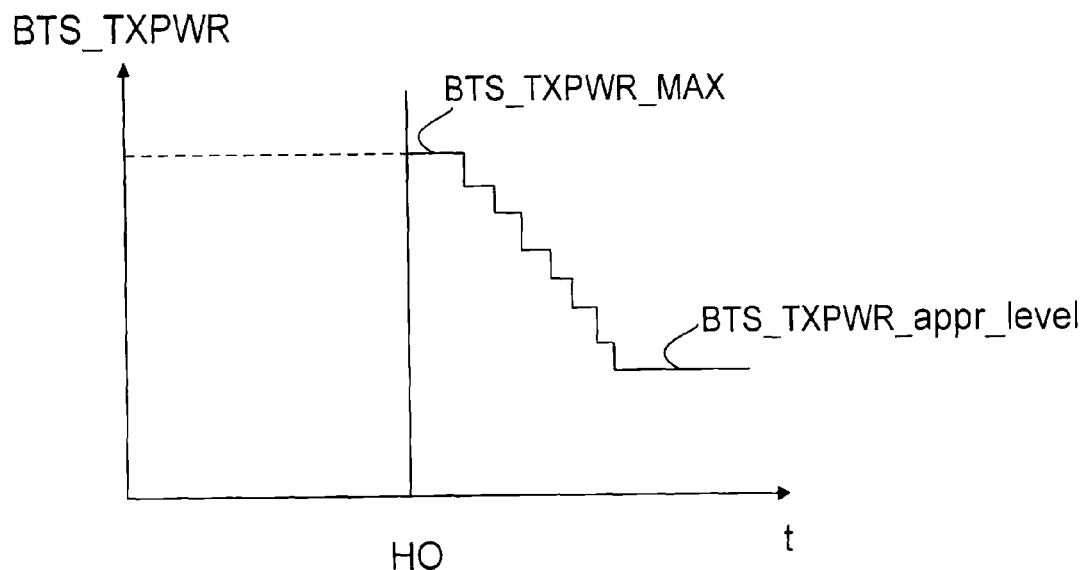

FIG. 2A and FIG. 2B illustrate block diagrams of prior art transmitting power control for the uplink (FIG. 2A) respectively for the downlink (FIG. 2B). In FIG. 2A, note that the mobile station MS is commanded, following the handover (HO), to initially utilize maximum output uplink power, MS_TXPWR_MAX and in FIG. 2B, the base transceiver station BTS is commanded, following the handover (HO) to use maximum output downlink power, BTS_TXPWR_MAX. The maximum powers are used initially due to that signal strength measurements on the target cell (or target BTS) before the handover, for most cases, are not performed on the channel to be used on after the handover and that measurements are only performed on the downlink. In addition, the highest allowable transmit power levels ensure an adequate link quality regardless of the location of the mobile station relative the serving BTS. Furthermore, the quality of the new channel in the target cell can not be estimated using these measurements. Thus, the created interference due to the use of maximum power levels by MS and by BTS are initially high and decrease first after that the power control algorithm(s) adjusts the power used by MS to an appropriate power level, denoted MS_TXPWR_appr_level (see FIG. 2A), and adjusts the power used by BTS to an appropriate power level, denoted BTS_TXPWR_appr_level (see FIG. 2B). It should be noted that powers used by the MS and the BTS are not necessarily equal. Furthermore, the range over which the MS is capable in reducing its output power from the MS_TXPWR_MAX to MS_TXPWR_appr_level during the control of its transmitting power is not necessarily similar to the range over which the BTS is capable in reducing its output power from the BTS_TXPWR_MAX to BTS_TXPWR_appr_level. The ranges over which the MS and the BTS reduce their powers are usually design parameters that depend, among others, on the type of the mobile communication system used in the network.

According to a method of an exemplary embodiment of the present invention, it is advantageous that the output uplink power level used by the mobile station MS 10 and the output downlink power level used by the base transceiver station BTS2 12 are during the handover procedure and directly after the handover high enough in order to guarantee that handover signalling is robust and when the signalling is completed, MS 10 and BTS2 12 are ordered to reduce their powers to appropriate power levels that are based on at least previous power control levels used a time after previous handovers were completed between the originating cell and the target cell.

Prior to explaining how power control is performed in accordance with the method of an exemplary embodiment of the present invention, it is important to describe the handover signalling that is required between a mobile station and a target base station.

Figure 3A:
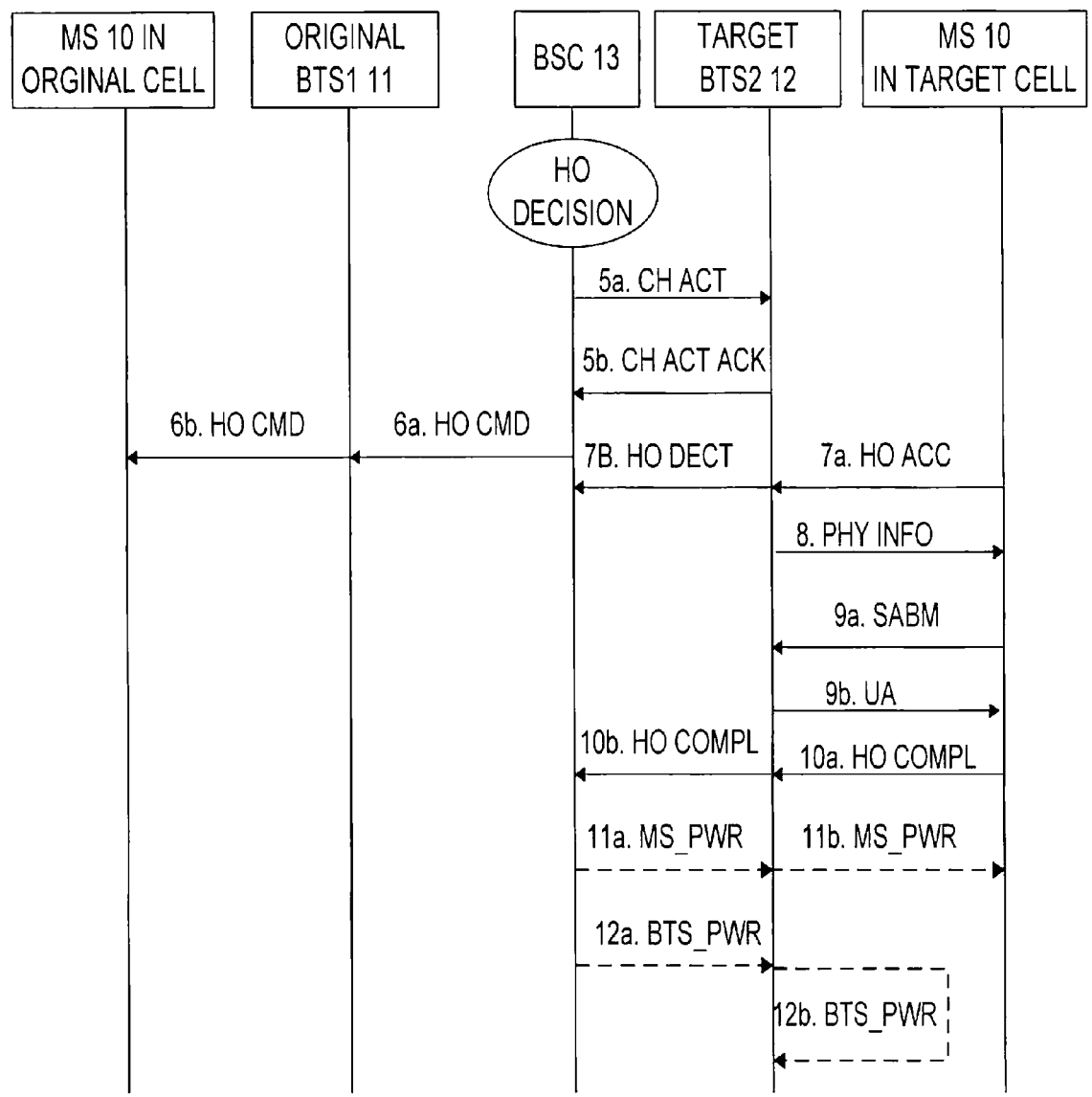
FIG. 3A-3B illustrates signalling messages required for performing and completing a handover in accordance with embodiments of the present invention.
Figure 3B:
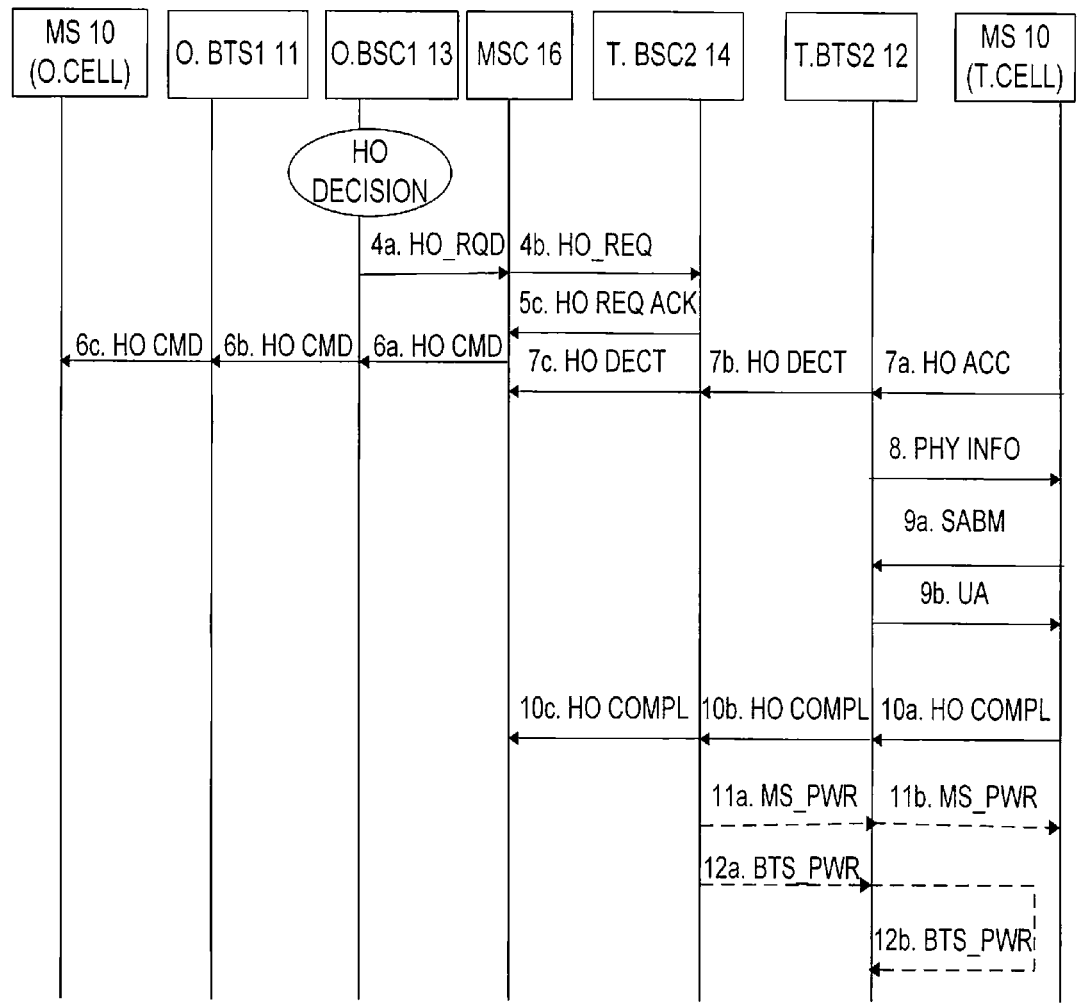

Referring to FIG. 3A and FIG. 3B there are illustrated signalling messages that are used between the mobile station and the target BTS prior to commanding the mobile station and the target BTS to adjust their output powers in accordance with the present invention. Note that FIG. 3A illustrates a first handover scenario in which BSC 13 is controlling both the original BTS1 11 and the target BTS2 12 as previously shown in FIG. 1A, whereas FIG. 3B illustrates the case where the original BTS1 11 is controlled by first BSC1 13 and the second BTS2 12 is controlled by BSC2 14. The BSCs 13 and 14 are connected to each other via a MSC 16 as illustrated in the exemplary scenario of FIG. 1B.

For reasons of clarity, only signalling messages performed after a handover decision is made by a BSC are considered. The reason is that the decision on the handover is not essential to the present invention.

Referring to FIG. 3A, after that a decision is made by the BSC 13, the BSC 13 attempts to allocate a traffic channel in the target BTS2 12. If a traffic channel can be allocated, at step 5A, the BSC 13 sends a channel activation message CH ACT message to the target BTS2 12. In GSM, the channel activation message CH ACT includes a handover reference number, the initial mobile station MS power order and the type of channel requested. Responsive to the channel activation message, at step 5b, the target BTS2 12 sends a channel activation acknowledgment message CH ACT ACK to the BSC 13 if the set up of resources is successful. At step 6a, BSC 13 sends a handover command message HO CMD to the MS 10 via the originating BTS1 11 (step 6b), which orders the MS 10 to switch to the new channel setup by the target BTS2 12. The HO CMD message also includes a power order that the MS 10 shall initially use on the new channel. At step 7a, responsive to the HO CMD message, the MS 10 releases the old channel and, switches to the new channel and begins transmitting handover access burst HO ACC to the BTS2 12 which in turn informs the BSC 13 by sending, at step 7b, a handover detect message HO DECT. This message is also used to inform the BSC 13 that the MS 10 has tuned to the new dedicated channel. It should be noted that the HO ACC burst is used to measure how the MS 10 shall adjust its transmission in time to the time slot structure, i.e. HO ACC burst is used to measure the time alignment to be used by the MS 10. The target BTS2 12 then begins, at step 8, transmitting the physical information PHY INFO to the MS 10, which includes the time alignment order (time adjustment for transmission uplink) to the MS 10. At step 9a-9b and responsive to PHY INFO, the MS 10 starts a handshaking procedure to set up layer 2. This is known as SABM/UA (set asynchronous balanced mode/unnumbered acknowledgment) handshaking. The handshaking procedure is completed by that the MS 10 is ending the handover procedure by transmitting, at step 10a, a handover complete message HO COMPL to the target BTS2 12. The BTS2 12 then sends, at step 10b, a handover complete message, HO COMPL, to the BSC 13.

According to an embodiment of the present invention, the reception of the handover complete message HO COMPL by the target base station BTS2 12 or by the base station controller BSC 13 will trigger the control of the output uplink power level of the MS 10 and the control of the output downlink power level of BTS2 12. Thus in accordance with the present invention, the BSC 13 or the target BTS2 12 can control the output powers. Therefore, the node which will control the output power of the mobile station and the output power of the target base station will hereinafter be referred to as a network node. Upon the network node receiving the HO COMPL message, the MS 10 is commanded, at step 11a (or step 11b), in a MS power control command message, MS_PWR, to use an initial uplink power level that is based on previous power control levels used a time after previous handovers were completed between the originating cell (or original BTS1 11) and the target cell (or target BTS2 12). The network node further commands, upon the reception of the HO COMPL message, the BTS2 12 either at step 12a (if the network node is BSC 13), or internally at step 12b (in case the network node is BTS2 12) to use an initial downlink power level that is based on previous power control levels used a time after previous handovers were completed between the originating cell (or original BTS1 11) and the target cell (or target BTS2 12). The command used is a base station power control command message, BS_PWR.

Referring to FIG. 3B, there are illustrated signalling messages for the case where the original BTS1 11 is controlled by BSC1 13 and the second BTS2 is 12 controlled by BSC2 14.

The BSCs 13 and 14 are connected via the MSC 16 as illustrated in the exemplary scenario of FIG. 1B. This scenario differs from the one described above in that, after a decision (HO DECISION) is made by the originating BSC1 13, the BSC1 13 requests, at step 4a, the MSC 16 for a handover of the MS 10 in a HO_RQD message. The MSC 16 then sends, at step 4b, a handover request to the target BSC2 14 in a HO_REQ message. Thereafter, a channel activation procedure (not shown) is initiated similar to the one described in conjunction with the previous scenario (FIG. 3A). However in this scenario, the MSC 16 is informed of the channel activation (not shown), and receives at step 5c, a handover request acknowledgment message, HO REQ ACK, from the target BSC2 14 prior to sending a handover command message HO_CMD, at step 6c, to the MS 10, via the originating BSC1 13 (step 6a) through the originating BTS1 11 (step 6b). At step 7a, the MS 10 begins transmitting handover access burst HO ACC to the BTS2 12 which in turn informs the BSC2 14 by sending, at step 7b, a handover detect message HO DECT. The MSC 16 is also informed of the HO DECT message (step 7c).

The target BTS2 12 then begins, at step 8, transmitting the physical information PHY INFO to the MS 10, which includes the time alignment order (time adjustment for transmission uplink) to the MS 10. At step 9a-9b and responsive to PHY INFO (step 8), the MS 10 starts a handshaking procedure to set up layer 2 similar to the one described earlier (SABM/UA handshaking). The handshaking procedure is completed by that the MS 10 is ending the handover procedure by transmitting, at step 10a, a handover complete message HO COMPL to the target BTS2 12. The BTS2 12 then sends, at step 10b, a handover complete message, HO COMPL, to the BSC2 14. The BSC2 14 also informs the MSC 16, at step 10c, of the completion of the handover. For reasons of clarity, FIG. 3B does not include all signalling messages.

Similarly to the previously described scenario and according to an embodiment of the present invention, the reception of the handover complete message HO COMPL by the target base station BTS2 12 or by the target base station controller BSC2 14 will trigger the control of the output uplink power level of the MS 10 and the control of the output downlink power level of BTS2 12. Note that the BSC2 14 or the target BTS2 12 can in this scenario control the output powers. Therefore, the node which will control the output power of the mobile station and the output power of the target base station is also referred to as a network node.

As described earlier, the control of the output uplink power level and the control of the downlink power level are triggered upon the reception of the handover complete message HO COMPL at the network node (BSC or BTS). The initial uplink power level is commanded in a MS_PWR message, at step 11a (or step 11b), and the initial downlink power level is commanded in a BTS_PWR message, at step 12a (or step 12b). It should be noted that the power levels used for initial signalling in the target base station during the handover are preferably high enough to guarantee the robustness of the handover signalling. As an example, the power levels during initial signalling maybe equal to maximum allowed power levels. It should also be noted that the present invention is not restricted to the order the command messages are sent/commanded i.e. the BTS_PWR message (step 12a or step 12b) may occur prior to the sending of the command message MS_PWR message (11a and 11b) to the mobile station.

Since the control of the output uplink and downlink power levels are based on previous or at least previous power control levels used a time after previous handovers were completed between the originating cell (or original BTS) and the target cell (or target BTS), these power control levels may, for example, be equal to the above described appropriate power levels MS_TXPWR_appr_level and BTS_TXPWR_appr_level.

Figures 4A, 4B:
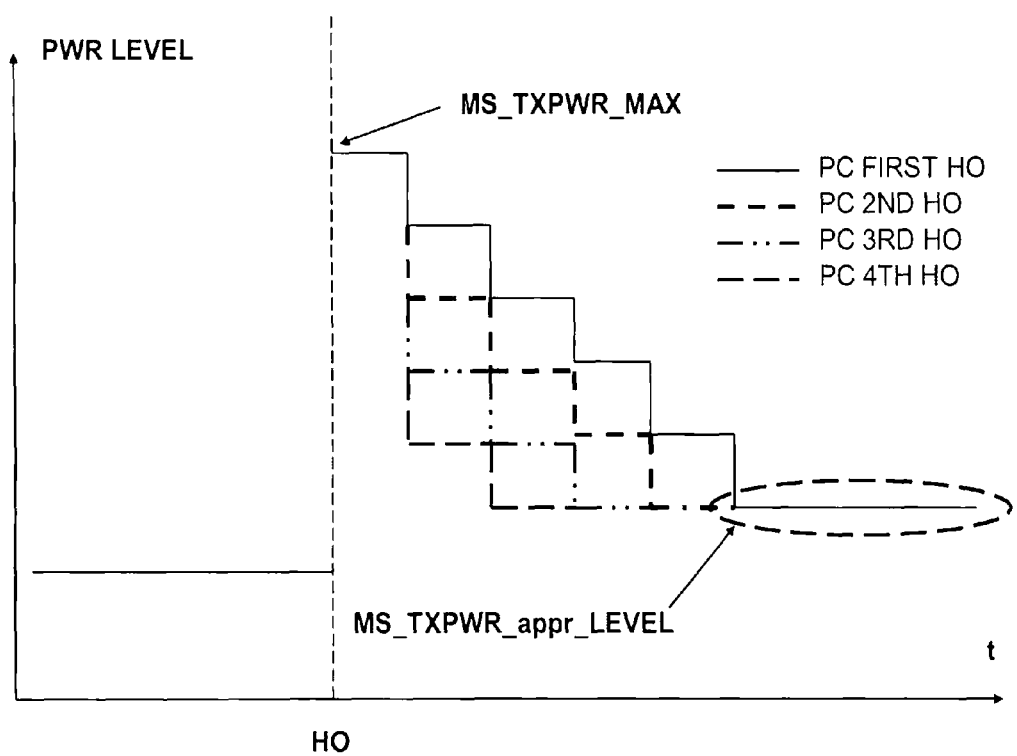
FIG. 4A illustrate an exemplary structure of a database according to an exemplary embodiment of the present invention.
FIG. 4B is a graph illustrating iterations towards an initial power control level, according to an exemplary embodiment of the present invention.

In an embodiment of the present invention, a database including power control levels is build up for each neighbour relation. That is, reached uplink power control level (e.g. MS_TXPWR_appr_level) and reached downlink power control level (e.g. BTS_TXPWR_appr_level) are stored in the database for each previously performed handover between an originating cell and a target cell. Thus each field in the database corresponds to a neighbour relation. FIG. 4A illustrates an example of a database comprising three neighbour relations (BTS 1-BTS 2; BTS 2-BTS 3, BTS 1-BTS 3) and corresponding power control levels (uplink and downlink) reached a time after handovers were completed between the neighbour relations.

Note that the present invention is not restricted to any particular number of neighbour relations nor it is restricted to the values of the power control levels depicted in FIG. 4A. In order to reach, for each neighbour relation, an uplink power control level, and a downlink power control level. several handovers (PC HOs) are required followed by iterations towards the power control levels. FIG. 4B is an example of a graph illustrating iterations towards an uplink power control level for a neighbour relation in which four handovers were performed each followed by output power adjustments (PC $1^{st}$ HO, PC $2^{nd}$ HO, PC $3^{rd}$ HO, and PC $4^{th}$ HO). As shown in FIG. 4B, a maximum uplink output power level was initially used by a mobile station, following the handover (HO), and after a couple of iterations, the uplink power control level, denoted MS_TXPWR_appr_level, is reached. It should be noted that for reasons of clarity FIG. 4B only shows iterations towards an uplink power control level. According to the present invention, iterations are, for the downlink, also conducted in order to reach a downlink power control level BTS_TXPWR_appr_level.

The database depicted in FIG. 4A is thus populated with the reached power control levels (i.e. with MS_TXPWR_appr_level and BTS_TXPWR_appr_level) for each neighbour relation.

According to the present invention, the database is stored in the network node e.g. in the BSC (or target BSC in case of an inter BSC-handover) or in the target BTS. The network node then, upon receiving the handover complete message HO COMPL, commands the mobile station to initially reduce its output uplink power level from e.g. the maximum output uplink power level to the power control level MS_TXPWR_appr_level and also commands the target base station (or BTS) to initially reduce its downlink output power level from e.g. the maximum output power level to the power control level BTS_TXPWR_appr_level. The BTS_TXPWR_appr_level is commanded by the network node in a base station power control command message and the MS_TXPWR_appr_level is commanded by the network node in a mobile station power control command message. After that the mobile station and the target BTS have reduced their output powers to MS_TXPWR_appr_level respectively BTS_TXPWR_appr_level, the normal power control algorithm may be used to further adapt/correct, if necessary, the power levels of the mobile station and the BTS.

Note that since the mobile station and the target base station are commanded to reduce their powers, following the handover, to the power control levels MS_TXPWR_appr_level respectively BTS_TXPWR_appr_level, less interference is created in the network. This is because the initial output power control levels of the mobile station and the target base station, following the handover, can directly (or as soon as possible) hit the appropriate power control levels (MS_TXPWR_appr_level, BTS_TXPWR_appr_level). Note further that since the mobile station can directly (or as soon as possible) hit its appropriate uplink power control level the battery power consumption is reduced.

It should be noted that the range over which the BTS and the MS are capable of reducing their output powers from e.g. their maximum levels to BTS_TXPWR_appr_level respectively MS_TXPWR_appr_level are a design choice. As an example, the range over which a BTS can reduce its output power from e.g. its maximum power level could be nominally 30 dB in 15 steps of nominally 2 dB, whereas the range over which the MS can reduce its output power from e.g. its maximum power level could for example be in steps of nominally 2 dB. However, as mentioned above the MS_TXPWR_appr_level and the BTS_TXPWR_appr_level included in the database can be reached either directly or as soon as possible. After that the appropriate levels are reached, the normal power control algorithm can be used to adapt the power levels (if necessary). The database is according to the present invention updated with reached power levels after each performed handover in the network. As an example, after a first handover between a first cell and a second cell, a target BTS is commanded to use BTS_TXPWR_appr_level according to a power level indicated in the database. The normal power algorithm can then, after the handover, be used to adjust the power level of the BTS to a new power level BTS_TXPWR_appr_level. The database is thereafter updated with this power level. In the next handover situation between the first cell and the second cell (i.e. same cell relation), the BTS is commanded to use the updated power level BTS_TXPWR_appr_level, indicated in the database. The normal power control algorithm is thereafter used to adjust (if necessary) the output power of the BTS and the database is once again updated and so on.

Note that the above described example is not restricted to the power control of the BTS power level, i.e. the database is also updated with MS_TXPWR_appr_level after each performed handover.

Figure 5:
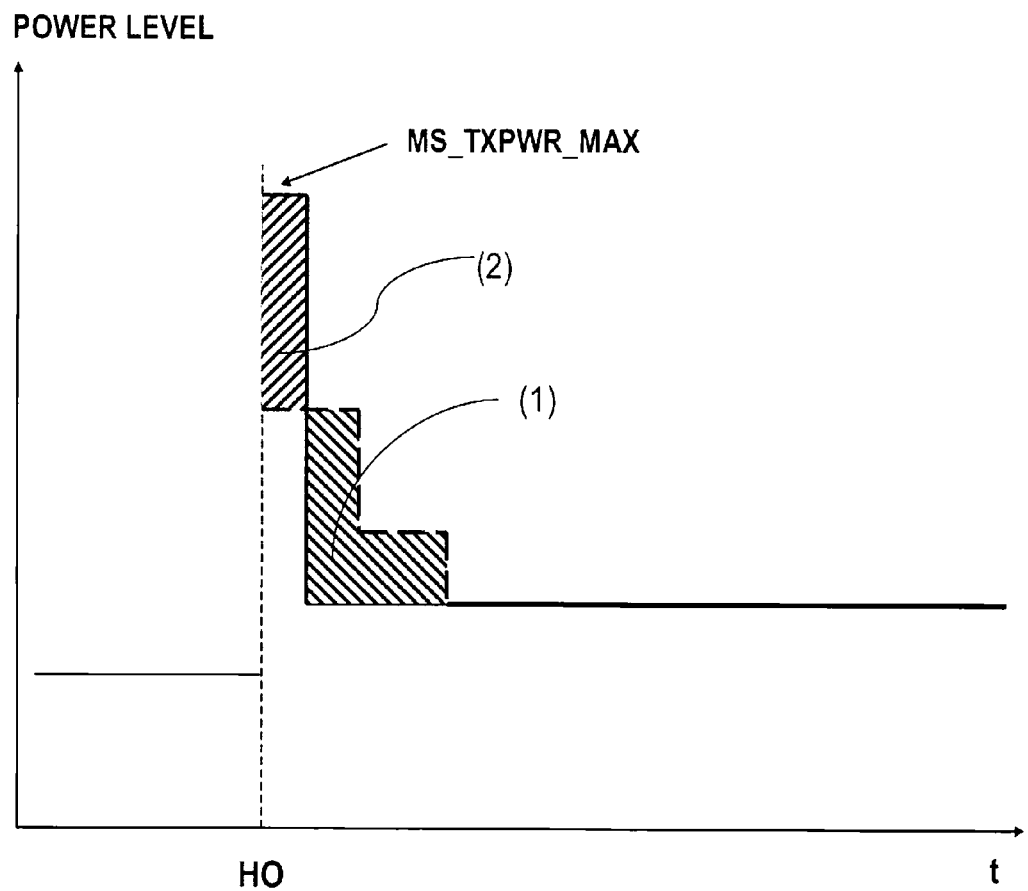
FIG. 5 is a graph illustrating the interference contribution, following a handover, of a prior art power control method vs. the interference contribution using a method according to an exemplary embodiment of the present invention.

Referring to FIG. 5, there is illustrated an example of the interference contribution (1) (for the uplink only), following a handover, of a prior art power control method versus an example of the interference contribution (2) (for the uplink only) according to the method of the present invention. The reason why only the interference contributions for the uplink are considered in FIG. 5 is that the prior art method is restricted to the uplink scenario. As shown, although the power level (MS_TXPWR_MAX) used in the beginning is higher than that of the prior art, the created interference is much less than that created using the prior art method.

According to another exemplary embodiment of the present invention, the initial uplink power level MS_TXPWR_appr_level of the mobile station and the initial downlink power level BTS_TXPWR_appr_level of the target base station are further based on a received power level, denoted RXLEV_TCELL, of a downlink signal of the target base station (or target BTS) that is measured before the handover is performed between the originating cell and the target. The received power level RXLEV_TCELL may therefore be stored in the database in addition to the power control levels. The received power level may further be updated in the database.

According to another exemplary embodiment of the present invention, the initial uplink power level of the mobile station MS_TXPWR_appr_level and the initial downlink power level of the target base station BTS_TXPWR_appr_level are further based on a received power level of a downlink signal of the target base station (or target BTS) that is measured after the handover is executed between the originating cell and the target. The received power level of a downlink signal measured after the handover may also be stored in the database and also updated when subsequent handovers occur between the originating cell and the target cell.

According to a further exemplary embodiment of the present invention, the initial downlink power level of the target base station and the initial uplink power level of the mobile station are further based on a path loss in the target cell. The information of the path loss may further be stored in the database and also updated when subsequent handovers occur between the originating cell and the target cell.

According to a further exemplary embodiment of the present invention, the initial downlink power level of the target base station and the initial uplink power level of the mobile station are further based on a timing advance value (e.g. the distance between the mobile station and the target base station) in the target cell (or target BTS), which value(s) are further stored and updated in the database.

According to a further exemplary embodiment of the present invention, the initial downlink power level of the target base station and the initial uplink power level of the mobile station are further based on a time when the handover occurs between the originating cell and the target cell (or target BTS). The timing of the handover may further be stored and updated in the database.

According to the present invention, the initial power control levels may further be based on other variables or parameters or measurements that describe radio conditions before or/and after the handover. The variables or parameter or measurements may further be stored and updated in the database.

It should be noted that the initial power control levels BTS_TXPWR_appr_level and MS_TXPWR_appr_level are however less or equal than the maximum power levels that the mobile station and the target base station are allowed/assigned to use in the network. The maximum allowed power levels may for example be used if measurements described above indicate bad radio conditions.

According to the present invention, the entries in the database are automatically updated with new entries for each new handover performed between an origination cell and a target cell in a neighbour relation in order to adapt to changes in network (or radio) conditions.

Figure 6:
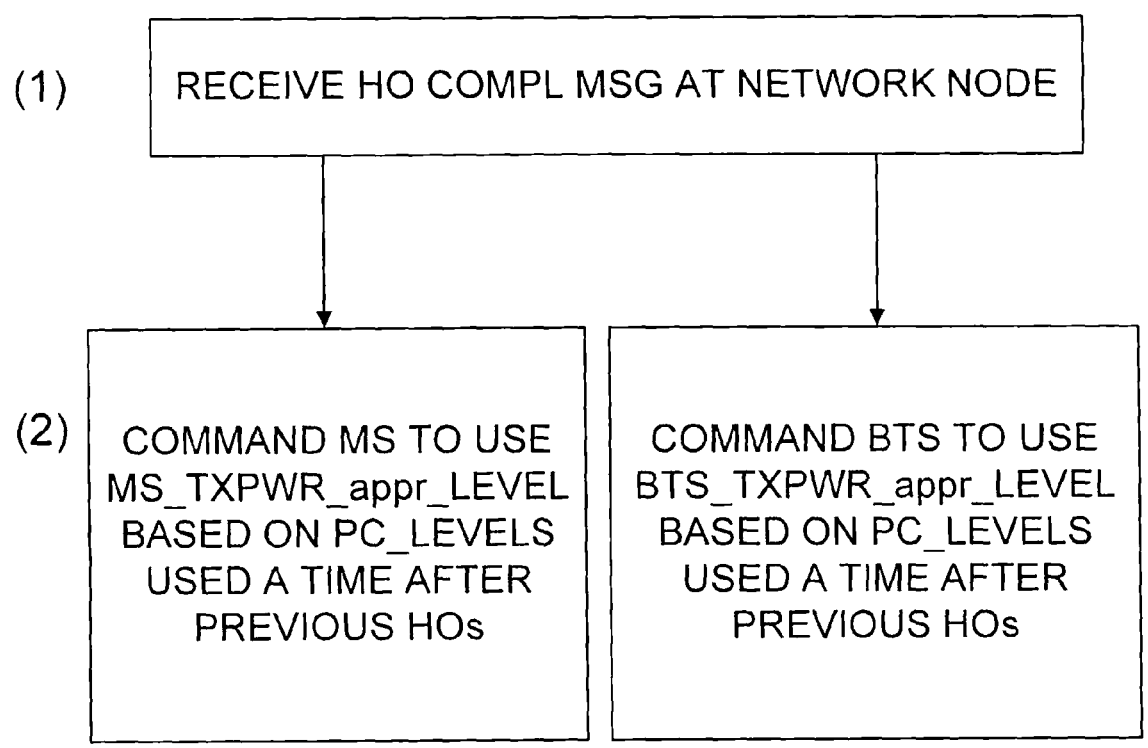
FIG. 6 illustrates a flowchart of the method according to an exemplary embodiment of the present invention

Referring to FIG. 6 there is illustrated a flowchart of a method, as described earlier, for controlling an output uplink power level of a mobile station and controlling an output downlink power level of a target base station in a target cell of a mobile communications system. As illustrated in FIG. 6, in step (1), a message is received at a network node of the mobile communications system, indicating that a handover of a mobile station from an originating cell to said target cell is completed. As explained earlier, this message corresponds to the HO COMPL message. The HO COMPL message (MSG) previously referred to step 10*a* and step 10*b* in FIG. 3A and FIG. 3B. Thus the network node that receives the HO COMPL message may be a base station controller or a base transceiver station.

At step 2, the network node commands the mobile station to use an initial output uplink power level MS_TXPWR_appr_level and commands the target base station to use an initial output downlink power level BTS_TXPWR_appr_level wherein the initial output uplink power level and the initial output downlink power level are based on at least previous power control (PC) levels used a time after previous handovers (HOs) were completed between the originating cell and the target cell. As described earlier, the normal power control algorithm may be used to further adapt/correct, if necessary, the power levels of the mobile station and the BTS.

Figure 7:
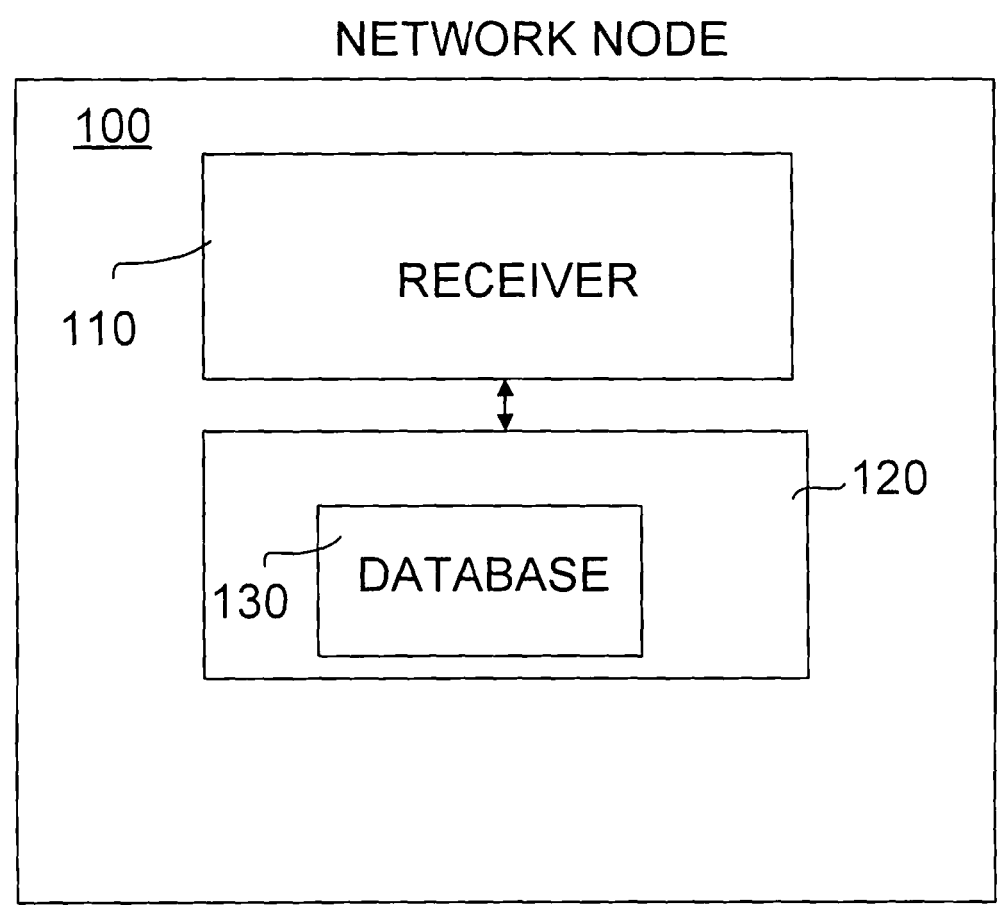
FIG. 7 is a schematic block diagram of an exemplary embodiment of a network node in accordance with an exemplary embodiment of the present invention.

Referring to FIG. 7, there is illustrated a schematic block diagram of an exemplary embodiment of a network node 100 for controlling an output uplink power level of a mobile station and for controlling an output downlink power level of a target base station in a target cell of mobile communications system. As illustrated, the network node comprises a receiver 110 that is configured to receive a message, HO COMPL message 10a, 10b indicating that a handover of the mobile station from an originating to the target cell is completed. The network node further comprises commanding means 120 that is operable to command, after reception of the HO COMPL message 10a, 10b in the receiver 110, the mobile station to use an initial output uplink power level MS_TXPWR_appr_level and configured to command the target base station to use an initial output downlink power level BTS_TXPWR_appr_level. The initial output uplink power level and initial output downlink power level are, according to the present invention based on at least previous power control levels used a time after previous handovers were completed between the originating cell and the target cell.

According to the present invention, the network node 100 is further configured to store in a database 130 the previous power control levels used a time after previous handovers between the originating cell and the target cell and further configured to store in the database 130 at least previous power control levels used a time after previous handovers between cells in the mobile communications system. The database 130 and the commanding means 120 are not necessarily part of a single unit, i.e. they could be separated.

According to an exemplary embodiment of the present invention, in case of an inter BSC handover (i.e. a handover between two cells that are controlled by different BSCs, see FIG. 3B), a target BSC is informed by the old BSC, on measured downlink signal strength of the target BTS measured in the old cell. The information may for example be sent, by the origination BSC to the target BSC, in the HO_RQD message and the HO_REQ message (see FIG. 3B).

A person skilled in the art appreciates that the present invention and its embodiments can be applied to any cellular or mobile communications system wherein power control is applicable, such as GPRS (General Packet Radio Service), EDGE (Enhanced Data rates for GSM Evolution), the JDC (Japanese Digital Cellular), WCDMA (Wide band Code Division Multiplexing Access), CDMA2000 (Code Division Multiplex Access), LTE (Long Term Evolution) and the WIMAX (Worldwide Interoperability for Microwave Access). The present invention is therefore not intended to be limited to any particular mobile communications system.

In addition, the present invention and its embodiments can be realised in many ways. For example, one embodiment of the present invention includes a non-transitory computer-readable medium having instructions stored thereon that are executable by a computer system for controlling an output uplink control level of a mobile station and an output downlink power level of a target base station. The instructions executable by the computing system and stored on the non-transitory computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method for controlling an output uplink power level of a mobile station and controlling an output downlink power level of a target base station in a target cell of a mobile communications system, the method comprising:
   receiving, at a network node of said mobile communications system, a message indicating that a handover of said mobile station from an originating cell to said target cell, is completed;
   commanding, after reception of said message, said target base station to use an initial output downlink power level where said initial output downlink power level is determined responsive to one or more previous output downlink power levels used by the target base station to communicate to one or more other mobile stations after their handovers were completed between said originating cell and said target cell; and
   commanding, after reception of said message, said mobile station to use an initial output uplink power level where said initial output uplink power level is determined responsive to one or more previous output uplink power levels used by one or more other mobile stations to communicate to the target base station after their handovers were completed between said originating cell and said target cell,
   where said initial output downlink power level and said initial output uplink power level are further based on a timing advance value between the mobile station and the target base station,
   wherein the timing advance value is determined responsive to the distance between the mobile station and the target base station.

2. The method according to claim 1 where said initial output uplink power level and said initial downlink power level are further based on a received level of downlink signal strength of the target base station, measured before said handover between the originating cell and the target cell was executed.

3. The method according to claim 1 where said initial output downlink power level and said initial output uplink power level are further based on a path loss in said target cell.

4. The method according to claim 1 where the initial output downlink power level the target base station is to use is commanded by said network node in a base station power control command message.

5. The method according to claim 1 where the initial output uplink power level the mobile station is to use is commanded by said network node, in a mobile station power control command message.

6. The method according to claim 1, further comprising:
   storing, by said network node, said previous power control levels used at a time after previous handovers between said originating cell and said target cell, in a database;
   further storing, in said database, previous power control levels used at a time after previous handovers of one or more different mobile stations between cells in said mobile communications system; and
   accessing said database to retrieve the previous power control levels used after previous handovers of one or more different mobile stations between cells in said mobile communications system for use in determining the initial output uplink power level for use by the mobile station.

7. A method for controlling an output uplink power level of a mobile station and controlling an output downlink power level of a target base station in a target cell of a mobile communications system, the method comprising:
- receiving, at a network node of said mobile communications system, a message indicating that a handover of said mobile station from an originating cell to said target cell, is completed;
- commanding, after reception of said message, said target base station to use an initial output downlink power level where said initial output downlink power level is determined responsive to one or more previous output downlink power levels used by the target base station to communicate to one or more other mobile stations after their handovers were completed between said originating cell and said target cell; and
- commanding, after reception of said message, said mobile station to use an initial output uplink power level where said initial output uplink power level is determined responsive to one or more previous output uplink power levels used by one or more other mobile stations to communicate to the target base station after their handovers were completed between said originating cell and said target cell,
- where said initial output downlink power level is lower than or equal to an output downlink power level used by said target base station during said handover of one or more different mobile stations and said initial output uplink power level is lower than or equal to an output uplink power level used by said mobile station for initial signaling said target cell during said handover of one or more different mobile stations,
- where said output uplink power level used by said mobile station for initial signaling in said target cell during said handover is equal to a maximum assigned output uplink power level after previous handovers of one or more different mobile stations, and said output downlink power level used by said target base station during said handover is equal to a maximum allowed output downlink power level after previous handovers of one or more different mobile stations.

8. A network node, of a mobile communications system, for controlling an output uplink power level of a mobile station and controlling an output downlink power level of a target base station in a target cell of said mobile communications system, said network node comprising:
- a receiver configured to receive a message indicating that a handover of said mobile station from an originating cell to said target cell is completed; and
- circuitry configured to command, after reception of said message, said mobile station to use an initial output uplink power level, where said initial output uplink power level is determined responsive to one or more previous output uplink power levels used by one or more other mobile stations to communicate to the target base station after their handovers were completed between said originating cell and said target cell; and
- wherein the circuitry configured to command is further configured to command, after reception of said message, said target base station to use an initial output downlink power level, where said initial output downlink power level is determined responsive to one or more previous output downlink power levels used by the target base station to communicate to one or more other mobile stations after their handovers were completed between said originating cell and said target cell,
- where said initial output downlink power level and said initial output uplink power level are further based on a timing advance value between the mobile station and the target base station,
- wherein the timing advance value is determined responsive to the distance between the mobile station and the target base station.

9. The network node according to claim 8 where said initial output uplink power level and said initial downlink power level are further based on a received level of a downlink signal of the target base station, measured before said handover between the originating cell and the target cell was executed.

10. The network node according to claim 8 where said initial output downlink power level and said initial output uplink power level are further based on a path loss in said target cell.

11. The network node according to claim 8 wherein the circuitry configured for commanding further commands, using a base station power control command message, said target base station to use the initial output downlink power level.

12. The network node according to claim 8 where wherein the circuitry configured for commanding further commands, using a mobile station power control command, said mobile station to use the initial output uplink power level.

13. The network node according to claim 8 where said network node is a base station controller BSC in said mobile communications system.

14. The network node according to claim 13 is further operable, in an inter-BSC handover, to inform, by an originating BSC, a target BSC, of a measured downlink signal strength of the target base station.

15. A network node, of a mobile communications system, for controlling an output uplink power level of a mobile station and controlling an output downlink power level of a target base station in a target cell of said mobile communications system, said network node comprising:
- a receiver configured to receive a message indicating that a handover of said mobile station from an originating cell to said target cell is completed; and
- circuitry configured to command, after reception of said message, said mobile station to use an initial output uplink power level, where said initial output uplink power level is determined responsive to one or more previous output uplink power levels used by one or more other mobile stations to communicate to the target base station after their handovers were completed between said originating cell and said target cell; and
- wherein the circuitry configured to command is further configured to command, after reception of said message, said target base station to use an initial output downlink power level, where said initial output downlink power level is determined responsive to one or more previous output downlink power levels used by the target base station to communicate to one or more other mobile stations after their handovers were completed between said originating cell and said target cell,
- where said initial output downlink power level is lower than or equal to an output downlink power level used by said target base station during said handover of one or more different mobile stations and said initial output uplink power level is lower than or equal to an output uplink power level used by said mobile station for initial signaling in said target cell during said handover of one or more different mobile stations,
- where said output uplink power level used by said mobile station for initial signaling in said target cell during said handover is equal to a maximum assigned output uplink power level after previous handovers of one or more different mobile stations, and said output downlink power level used by said target base station during said handover is equal to a maximum allowed output downlink power level after previous handovers of one or more different mobile stations.

16. A non-transitory computer-readable medium having instructions stored thereon, which are executable by a computer system, configured to control an output uplink power level of a mobile station and configured to control an output downlink power level of a target base station in a target cell of a mobile communications system, the instructions comprising:

instructions configured to receive a message indicating that a handover of said mobile station from an originating cell to said target cell, is completed;

instructions configured to command, after reception of said message, said target base station to use an initial output downlink power level where said initial output downlink power level is determined responsive to one or more previous output downlink power levels used by the target base station to communicate to one or more other mobile stations after their handovers were completed between said originating cell and said target cell; and instructions configured to further command, after reception of said message, said mobile station to use an initial output uplink power level where said initial output uplink power level is determined responsive to one or more previous output uplink power levels used by one or more other mobile stations to communicate to the target base station after their handovers were completed between said originating cell and said target cell, where said initial output downlink power level and said initial output uplink power level are further based on a timing advance value between the mobile station and the target base station, wherein the timing advance value is determined responsive to the distance between the mobile station and the target base station.

* * * * *

UNITED STATES PATENT AND TRADEMARK OFFICE
CERTIFICATE OF CORRECTION

Page 1 of 1

PATENT NO. : 8,908,635 B2
APPLICATION NO. : 12/593931
DATED : December 9, 2014
INVENTOR(S) : Boncz et al.

It is certified that error appears in the above-identified patent and that said Letters Patent is hereby corrected as shown below:

In the Specification,

In Column 11, Line 49, delete "Multiplex" and insert -- Multiple --, therefor.

In the Claims,

In Column 14, Line 17, in Claim 11, delete "claim 8 wherein" and insert -- claim 8 where --, therefor.

In Column 14, Line 22, in Claim 12, delete "claim 8 where wherein" and insert -- claim 8 where --, therefor.

Signed and Sealed this
Fourth Day of August, 2015

Michelle K. Lee
*Director of the United States Patent and Trademark Office*